United States Patent
Hirakura et al.

(10) Patent No.: US 6,762,991 B1
(45) Date of Patent: Jul. 13, 2004

(54) SIGNAL GENERATOR AND OFDM MODULATOR SYNCHRONIZED TO EXTERNAL DEVICE

(75) Inventors: Takao Hirakura, Yokohama (JP); Seiji Isobe, Yokohama (JP)

(73) Assignee: Kabushiki Kaisha Kaisha, Kawasaki (JP)

( * ) Notice: Subject to any disclaimer, the term of this patent is extended or adjusted under 35 U.S.C. 154(b) by 0 days.

(21) Appl. No.: 09/526,472

(22) Filed: Mar. 15, 2000

(30) Foreign Application Priority Data

Mar. 19, 1999 (JP) .......................................... 11-075096

(51) Int. Cl.⁷ .............................................. H04J 11/00
(52) U.S. Cl. ..................................... 370/203; 455/118
(58) Field of Search ................................ 370/208, 203, 370/503, 516, 518; 375/295, 344, 354, 359, 327, 296, 307; 455/20, 24, 63.1, 86, 114.2, 118, 131, 147, 313

(56) References Cited

U.S. PATENT DOCUMENTS

| | | | | |
|---|---|---|---|---|
| 5,406,551 A | * | 4/1995 | Saito et al. ................. | 370/203 |
| 5,471,464 A | * | 11/1995 | Ikeda ......................... | 370/203 |
| 5,602,835 A | * | 2/1997 | Seki et al. .................. | 370/517 |
| 5,687,165 A | * | 11/1997 | Daffara et al. ............. | 370/208 |
| 5,694,389 A | * | 12/1997 | Seki et al. .................. | 370/208 |
| 5,838,734 A | * | 11/1998 | Wright ....................... | 375/316 |
| 5,889,759 A | * | 3/1999 | McGibney .................. | 375/344 |
| 6,021,110 A | * | 2/2000 | McGibney .................. | 370/208 |
| 6,282,413 B1 | * | 8/2001 | Baltus ........................ | 455/323 |

FOREIGN PATENT DOCUMENTS

| EP | 0 822 691 | 2/1998 |
|---|---|---|
| JP | 8-51408 | 2/1996 |
| JP | 9-508254 | 8/1997 |

OTHER PUBLICATIONS

ETSI EN 300 V1.1.2, pp. 24–26, XP–002264138, "Digital Video Broadcasting (DVB); Framing Structure, Channel Coding and Modulation for Digital Terrestrial Television", Aug. 1997.

C. Little, Electronics World + Wireless World, vol. 102, No. 1719, pp. 130–135, XP–000553560, "Fractional–N Synthesis", Feb. 1, 1996.

* cited by examiner

Primary Examiner—Chau Nguyen
Assistant Examiner—Andy Lee
(74) Attorney, Agent, or Firm—Oblon, Spivak, McClelland, Maier & Neustadt, P.C.

(57) ABSTRACT

An OFDM modulator includes an OFDM modulator section for conducting OFDM modulation on a signal, based upon an OFDM clock $F_{CLK}$, and outputting an OFDM signal, an adder for adding the OFDM clock $F_{CLK}$ to a local signal $F_{PLO}$ for frequency conversion, and a frequency converter for conducting frequency conversion on the OFDM signal supplied from the OFDM modulator section, based upon an output signal of the adder. The OFDM modulator thus outputs an IF signal having a frequency equivalent to that of the local signal. As a result, the floating frequency component of the OFDM clock on the OFDM modulator section side is canceled by the floating frequency component of the OFDM clock on the frequency adder side. There is thus obtained an IF signal which can be synchronized to a frequency (for example, 10 MHz) of an external device and which has the same frequency as that of the local signal $F_{PLO}$.

4 Claims, 2 Drawing Sheets

SIGNAL GENERATOR AND OFDM MODULATOR SYNCHRONIZED TO EXTERNAL DEVICE

CROSS-REFERENCE TO RELATED APPLICATIONS

This application is based upon and claims the benefit of priority from the prior Japanese Patent Application No. 11-075096, Mar. 19, 1999, the entire contents of which are incorporated herein by reference.

BACKGROUND OF THE INVENTION

The present invention relates to a signal generator synchronized to an external device having an oscillation frequency divisible by an integer, such as 10 MHz. Furthermore, the present invention relates to an OFDM modulator for conducting frequency conversion on the basis of an OFDM clock ($F_{CLK}$) and a local frequency ($F_{LO}$).

The OFDM modulator generates an OFDM signal having a center frequency $F_{CLK}$ by using an OFDM clock ($F_{CLK}$), converts frequency conversion on the OFDM signal by using a local frequency ($F_{LO}$), and outputs an OFDMIF signal having a center frequency $F_{IFO}$. $F_{CLK}$ and $F_{LO}$ need to be synchronized to an external reference signal ($F_{REF}$) of 10 MHz and thereby stabilized. Therefore, a synchronization circuit is needed for each of oscillators.

A conventional OFDM modulator includes an OFDM modulator section supplied with the OFDM clock ($F_{CLK}$) from an OFDM clock oscillator, and a local frequency ($F_{LO}$) oscillator. Furthermore, the conventional OFDM modulator includes a frequency converter section for conducting frequency conversion on signals supplied from them. As a result, an IF signal is outputted. In the conventional OFDM modulator, however, 8.192 MHz is used as the OFDM clock ($F_{CLK}$) and 45.342 MHz (=8.192 MHz+37.15 MHz) is used as the local signal as an example, in order to achieve synchronization to an external device. Modulation processing and frequency conversion processing are thus conducted.

In the case of the system of terrestrial digital broadcast, however, it is not possible to use the above described divisible frequency such as 8.192 MHz. As for $F_{CLK}$, 512/63=8.126984 . . . MHz is demanded. Therefore, the local signal for frequency conversion also becomes $F_{LO}=F_{IFO}+F_{CLK}$=37.15+8.126984 . . . =45.286984 . . . MHz. However, this frequency has a floating component. Therefore, neither of them can be synchronized to the external reference signal of 10 MHz. (Herein, a frequency having a part which is indivisible by an integer, such as 45.286984 . . . MHz is referred to have a floating frequency component.)

In the conventional OFDM modulator, therefore, the demanded OFDM clock ($F_{CLK}$) of the terrestrial digital broadcast cannot be met. If this frequency $F_{CLK}$ is used as it is, synchronization to the external frequency (10 MHz) is impossible. This results in a problem that an IF signal output having a floating frequency component is outputted.

In not only the OFDM modulator but also a general signal generator, synchronization to the external frequency (10 MHz) is impossible in the case where the clock oscillator includes a floating frequency component. In the same way, therefore, there exists a problem that an IF signal output having a floating frequency component is outputted.

BRIEF SUMMARY OF THE INVENTION

An object of the present invention is to provide a signal generator synchronized to an external device while using a clock oscillator of a frequency which is indivisible by an integer and consequently which has a floating frequency component.

Another object of the present invention is to provide an OFDM modulator for producing an IF signal output having no floating frequency component by using an OFDM clock ($F_{CLK}$) which is the system of the terrestrial digital broadcast.

In accordance with the present invention, a signal generating apparatus includes: output means for conducting predetermined processing on a given signal, based upon a clock signal having a first frequency ($F_{CLK}$, $f_1$) including a floating frequency component supplied from a first oscillator, and outputting a first signal having the first frequency; adder means for adding a second signal having a second frequency ($F_{PLO}$, $f_2$) including no floating frequency component, supplied from a second oscillator (and the clock signal supplied from the first oscillator, and outputting a third signal having a frequency equivalent to sum of the first frequency and the second frequency; and frequency converter means for receiving the first signal outputted from the output means and the third signal outputted from the adder means, conducting frequency conversion based upon the first signal and the third signal, and thereby outputting an output signal having the second frequency including no floating frequency component.

According to the present invention, the above described structure is used. Even in such a signal generator that a clock signal includes a floating frequency component, the second oscillator outputs a second frequency which is divisible by an integer and which does not include a floating frequency component, and an intermediate frequency addition and subsequent frequency conversion processing are conducted. As a result, a finally obtained signal can be made to have the same frequency as the frequency supplied from the second oscillator. According to the present invention, therefore, it becomes possible to provide a signal generator capable of outputting such a signal that a PLL (phase locked loop) can be formed with an external device having a reference oscillator of, for example, 10 MHz.

Furthermore, the present invention can also be applied to a signal generator especially conducting OFDM modulation, i.e., to an OFDM modulator. In this case as well, the same operation effects are brought about.

In other words, subtraction is conducted in a frequency converter circuit 15, between an OFDM clock ($F_{CLK}$) component supplied from an OFDM modulator section side and an OFDM clock ($F_{CLK}$) component supplied from a frequency adder 16 side of a frequency converter circuit 15. As a result, a finally obtained IF signal output have the same frequency as that of the local oscillator. Accordingly, a PLL (phase locked loop) can be formed with an external device having a reference oscillator of, for example, 10 MHz. Also as for the OFDM modulator using an OFDM clock oscillator having a frequency of 512/63=8.126984 . . . MHz demanded in the system of terrestrial digital broadcast, therefore, it becomes possible to provide an OFDM modulator which outputs an IF signal having a frequency of, for example, 37.15 MHz according to the frequency of the local oscillator and allowing synchronization to a peripheral reference oscillator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
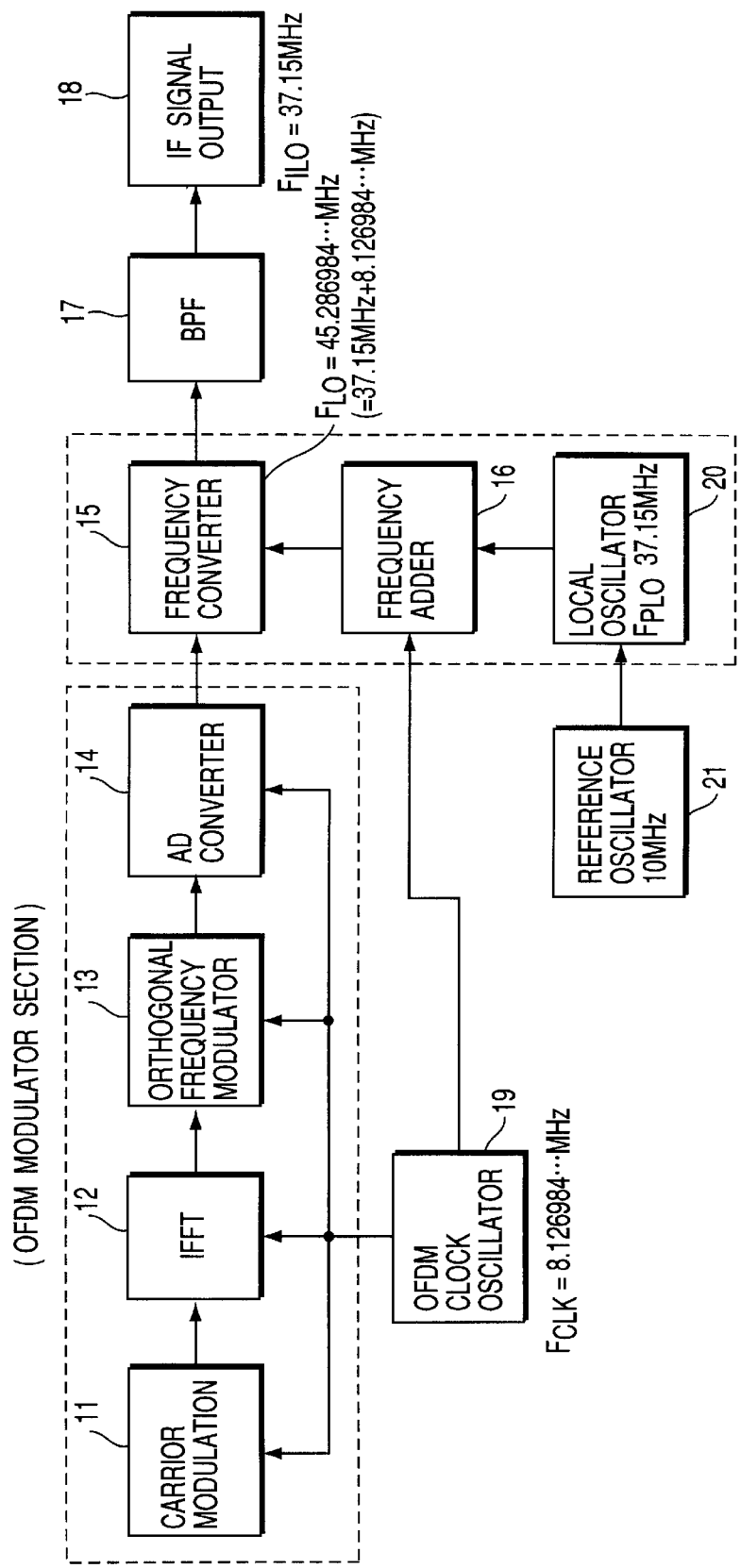
FIG. 1 is a block diagram showing an example of an OFDM modulating circuit according to the present invention.

Hereafter, an embodiment of the present invention will be described by referring to the drawing.

FIG. 1 is a block diagram of an OFDM modulating circuit according to the present invention. In FIG. 1, an OFDM modulating circuit according to the present invention includes a carrier modulation circuit 11, an IFFT 12, an orthogonal frequency modulator 13, a D/A converter 14, an OFDM clock ($F_{CLK}$) oscillator 19 for supplying an OFDM clock ($F_{CLK}$) to them, a frequency converter 15 for receiving the output of the D/A converter 14, a frequency adder 16 connected to the OFDM clock ($F_{CLK}$) oscillator 19 and a local oscillator 20, a reference oscillator 21 connected to the local oscillator 20, and a BPF 17. As a result, the OFDM modulating circuit outputs an IF signal 18.

In the OFDM modulating circuit according to the present invention having such a configuration, a signal supplied to the carrier modulation circuit 11 is subjected to carrier modulation, supplied to the IFFT 12, and supplied therefrom to the orthogonal frequency modulator 13. In the orthogonal frequency modulator 13, orthogonal frequency modulation is conducted on a signal supplied from the IFFT on the basis of a clock signal of 512/63=8.126984 . . . MHz supplied from the OFDM clock ($F_{CLK}$) oscillator 19 which is $F_{CLK}$ according to the system of the terrestrial digital broadcast. The modulated OFDM signal is converted to an analog signal by the D/A converter 14.

Furthermore, this OFDM signal is subjected to frequency conversion by the frequency converter 15. A signal for frequency conversion at this time becomes a signal obtained by adding, in the frequency adder 16, the OFDM clock ($F_{CLK}$) 8.126984 . . . MHz and a frequency of 37.15 MHz fed from the local oscillator 20. This value is 45.286984 . . . MHz. A center frequency $F_{IFO}$ of an output obtained by the frequency converter 15 and the BPF 17 becomes $F_{IFO}=F_{LO}-F_{CLK}=(F_{PLO}+F_{CLK})-F_{CLK}=F_{PLO}=37.15$ MHz. In the frequency converter, therefore, subtraction is conducted between the OFDM clock ($F_{CLK}$) component included in the OFDM signal and the OFDM clock ($F_{CLK}$) component included in the local signal for frequency conversion, and frequency conversion is conducted.

As a result, the floating frequency component of the OFDM clock oscillator 19 does not appear in the IF signal output obtained from the BPF 17. In addition, the local oscillator is also stabilized by the reference oscillator. Therefore, an accurate stable IF signal can be obtained.

Figure 2:
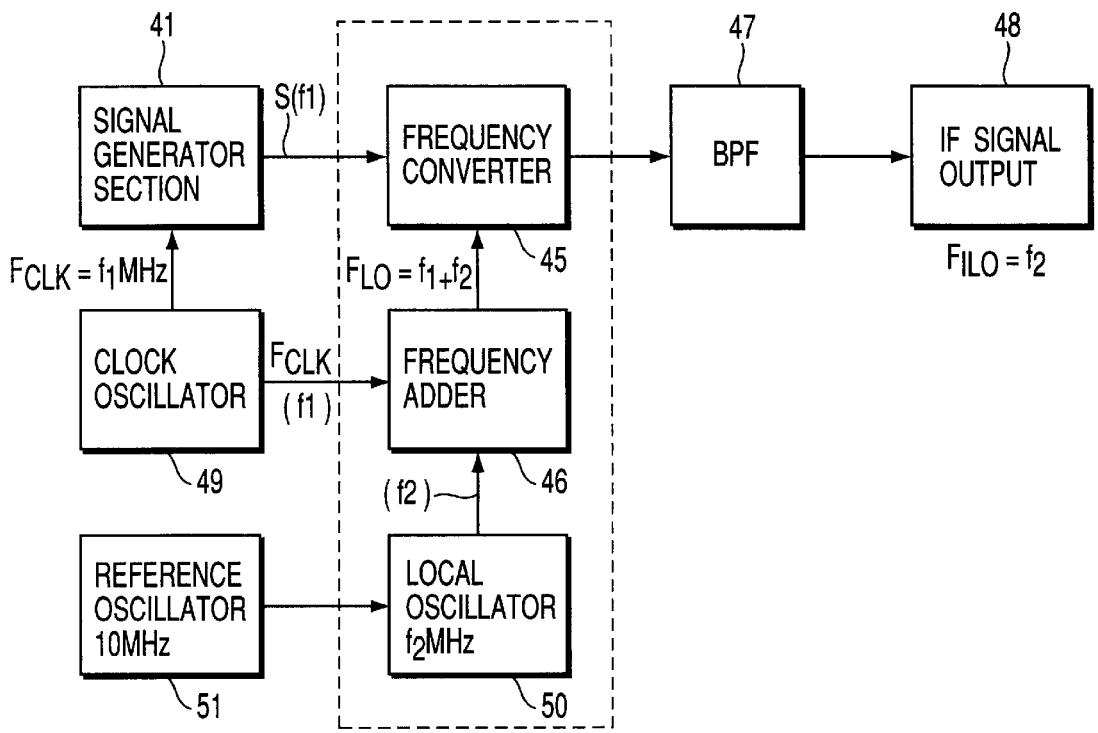
FIG. 2 is a block diagram showing an example of a modulating circuit according to the present invention.

FIG. 2 is a block diagram showing an example of a signal generator according to the present invention. In other words, FIG. 2 shows that the signal generator which is not affected in output signal frequency by the clock frequency owing to a feature of the present invention can be realized in not only the case of the above described OFDM modulator but also in a general signal generator.

With reference to FIG. 2, a signal generator according to the present invention includes a signal generator section 41 for conducting predetermined processing on a given signal and generating a signal forming the foundation of an IF signal to be outputted, and a clock oscillator 49 for supplying a clock signal $F_{CLK}$ having a frequency $f_1$ including a floating frequency component to the signal generator section 41. The signal generator further includes a reference oscillator 51 for generating a reference signal serving as a reference (having a frequency of, for example, 10 MHz), a local oscillator 50 for receiving the reference signal from the reference oscillator 51 and generating a local signal which is in frequency $f_2$ MHz having no floating frequency component and which can be synchronized to the reference signal, and a frequency adder 46 for receiving the local signal from the local oscillator 50, adding the frequency $f_1$ supplied from the clock oscillator 49 and the frequency $f_2$ supplied from the local oscillator 50, and outputting a signal $F_{LO}$ (having a frequency of $f_1+f_2$). The signal generator further includes a frequency converter 45 for receiving the signal $F_{LO}$ (having the frequency of $f_1+f_2$) from the frequency adder 46, and a band pass filter 47 for receiving an output of the frequency converter 45, and an IF signal output section 48 for receiving an output of the band pass filter 47.

In such a configuration of the signal generator according to the present invention, a signal S is outputted from the signal generator section on the basis of the clock signal $F_{CLK}$ supplied from the clock oscillator 49. It should be noted at this time that the clock signal $F_{CLK}$ has a frequency $f_1$ which is indivisible by an integer and consequently includes a floating frequency component, and the signal S outputted from the signal generator section 41 also has this frequency $f_1$.

On the other hand, a reference signal of, for example, 10 MHz is supplied from the reference oscillator 51. While being synchronized to the reference signal, a signal of a frequency $f_2$ MHz which does not include a floating frequency component is outputted to the frequency adder 46. A signal having a frequency $F_{LO}=f_1+f_2$ which is the sum of the two frequencies supplied from the clock oscillator 49 and the local oscillator 50 is supplied from the frequency adder 46 to the frequency converter 45. As a result of frequency conversion conducted in the frequency converter 45, canceling is caused in frequency component between the signal supplied from the signal generator section and the signal supplied from the frequency adder. The floating frequency components thus cancel each other. As a result, a signal which is, in frequency, $f_2$ supplied from the local oscillator is supplied from the frequency converter 45 to the BPF 47. Furthermore, the IF signal output section 48 outputs an IF signal having the frequency $f_2$ which does not include a floating frequency component and capable of being synchronized to an external frequency (such as reference oscillator frequency 10 MHz).

According to the present invention as heretofore described, frequency conversion is conducted by using a local signal with the OFDM clock ($F_{CLK}$) added thereto. As a result, a floating frequency component based upon the OFDM clock ($F_{CLK}$) component is not generated. Without being synchronized to the reference signal, a stable output is obtained. Even in the case where the ratio between the clock frequency and the external reference signal 10 MHz is not an integer and consequently a PLL (phase locked loop) cannot be formed in the conventional technique because of the clock frequency having a floating frequency component, therefore, it becomes possible to provide an OFDM modulator producing an output having a frequency equivalent to that of a local oscillator and consequently allowing the PLL function.

In addition, even in the case of a general signal generator based upon a clock frequency including a floating frequency component instead of the OFDM clock, it becomes possible, by adopting the configuration of the present invention, to provide a signal generator supplying an output signal which has a frequency equivalent to that of the local oscillator, which is synchronized to a reference frequency of an external device without being affected by the clock frequency, and consequently which allows a PLL function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal generating apparatus comprising:
   output means for conducting predetermined processing on a given signal, based upon a clock signal having a first frequency including a floating frequency component supplied from a first oscillator, and outputting a first signal having the first frequency;
   adder means for adding a second signal having a second frequency including no floating frequency component, supplied from a second oscillator and the clock signal supplied from the first oscillator, and outputting a third signal having a frequency equivalent to sum of the first frequency and the second frequency; and
   frequency converter means for receiving the first signal outputted from the output means and the third signal outputted from the adder means, conducting frequency conversion based upon the first signal and the third signal, and thereby outputting an output signal having the second frequency including no floating frequency component.

2. A signal generating apparatus according to claim 1, wherein the signal of the first frequency supplied by a first oscillator includes a floating frequency component caused by a frequency which is indivisible by an integer, and consequently the signal of the first frequency cannot be synchronized to a signal having a reference frequency which is divisible by an integer and which does not include a floating frequency component.

3. An OFDM modulating apparatus comprising:
   output means for conducting OFDM modulation processing on a given signal, based upon an OFDM clock signal having a first frequency including a floating frequency component supplied from an OFDM oscillator, and outputting an OFDM signal having the first frequency;
   adder means for adding a local signal having a second frequency including no floating frequency component, supplied from a local oscillator and the OFDM clock signal supplied from the OFDM clock oscillator, and outputting a third signal having a frequency equivalent to sum of the first frequency and the second frequency; and
   frequency converter means for receiving the OFDM signal outputted from the output means and the third signal outputted from the adder means, conducting frequency conversion based upon the OFDM signal and the third signal, and thereby outputting an IF signal having the second frequency including no floating frequency component.

4. An OFDM modulating apparatus according to claim 3, wherein the OFDM signal has a frequency of 512/63= 8.126984 . . . MHz.

* * * * *